(12) United States Patent
Kimura et al.

(10) Patent No.: US 6,808,813 B2
(45) Date of Patent: Oct. 26, 2004

(54) CERAMIC ELECTRONIC DEVICE AND METHOD OF MANUFACTURING THE DEVICE

(75) Inventors: Takeshi Kimura, Hokkaido (JP); Emiko Igaki, Hyogo (JP); Hiroshi Ito, Hokkaido (JP); Osamu Yamashita, Hokkaido (JP); Masakazu Tanahashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 360 days.

(21) Appl. No.: 10/042,138

(22) Filed: Jan. 11, 2002

(65) Prior Publication Data

US 2003/0134133 A1 Jul. 17, 2003

(51) Int. Cl.[7] .............................. B32B 9/04; H01G 2/12; H01G 4/00; B05D 1/18; C25D 5/34
(52) U.S. Cl. ...................... 428/447; 428/450; 205/183; 205/205; 427/430.1; 427/435; 427/443.2; 361/272; 361/320
(58) Field of Search ................................. 205/162, 163, 205/183, 205, 206, 207; 428/446, 447, 448, 450; 427/430.1, 443.2, 435; 361/272, 320

(56) References Cited

U.S. PATENT DOCUMENTS

| 4,276,135 A | 6/1981 | Sato et al. |
| 4,327,369 A | 4/1982 | Kaplan |
| 6,043,330 A | 3/2000 | Hacker et al. |
| 6,127,040 A | 10/2000 | Grobbauer et al. |

FOREIGN PATENT DOCUMENTS

| EP | 0 548 996 | 6/1993 | |
| JP | 10-214741 | * 8/1998 | ........... H01F/41/02 |

OTHER PUBLICATIONS

Machine translation of JP 10–214741, provided by the JPO website.*

Patent Abstracts of Japan, vol. 1995, No. 04, May 1995 & JP 07 014433 (Jan. 1995) *Abstract*.

Patent Abstracts of Japan, vol. 1996, No. 03, Mar. 1996 & JP 07 307243 (Nov. 1995) *Abstract*.

Patent Abstracts of Japan, vol. 003, No. 014, Feb. 1979 & JP 53 138448 (Dec. 1978) *Abstract*.

* cited by examiner

Primary Examiner—Philip C. Tucker
Assistant Examiner—Michael J Feely
(74) Attorney, Agent, or Firm—Wenderoth, Lind & Ponack, L.L.P.

(57) ABSTRACT

A ceramic electronic device is protected at the surface from retention of water, thus having improved operation reliability, and a method of manufacturing the device is provided. A protective layer is formed on the ceramic element and external electrodes by dehydrating condensation of organic silicon compound.

8 Claims, 2 Drawing Sheets

CERAMIC ELECTRONIC DEVICE AND METHOD OF MANUFACTURING THE DEVICE

FIELD OF THE INVENTION

The present invention relates to a ceramic electronic device having a ceramic element and an external electrode on the ceramic element, and to a method of manufacturing the device.

BACKGROUND OF THE INVENTION

A multi-layer ceramic capacitor will be explained as a known ceramic electronic device.

FIG. 4 is a cross sectional view of a conventional multi-layer ceramic capacitor. The multi-layer ceramic capacitor 21 includes a ceramic element 24 and external electrodes 29, 30 provided on both sides of the ceramic element 24. The ceramic element 24 is formed through sintering alternate layers of dielectric ceramic 22 and internal electrode 23. The external electrodes 29, 30 include respective external electrode bases 25, 26 connected to their corresponding internal electrodes 23, nickel-plating layers 27 joined to the external electrode bases 25, 26, and solder- or tin-plating layers 28, respectively.

A method of manufacturing the conventional multi-layer ceramic capacitor 21 will be explained.

First, the dielectric ceramics 22 and the internal electrode 23 are placed and bonded alternately one over the other, and sintered together at a high temperature, thus providing the ceramic element 24.

Then, the ceramic element 24 has both sides to which a pattern of electrode paste is applied, and is sintered, thus providing the external electrode bases 25, 26. The material of the paste is identical to that of the internal electrode 23 or its alloy. Then, the nickel-plating layer 27 for improving the operational reliability and the solder-friendly characteristics is provided on each of the external electrode bases 25, 26. The solder- or tin-plating layer 28 is provided on the nickel-plating layer 27, thus providing each of the external electrodes 29 and 30. Then, a multi-layer ceramic capacitor 21 is provided.

The ceramic element 24 in the conventional multi-layer ceramic capacitor 21 may however be susceptible in its surface insulating properties to the environmental conditions. In particular, the insulating properties between the external electrodes 29 and 30 may possibly be declined under humid conditions.

Also, when the ceramic element 24 is wet at its surface with water, the solder- or tin-plating 28 may develop migration of metal, thus short-circuiting between the external electrodes 29 and 30. The plating layer 28 may be oxidized with absorbing water, hence declining its soldering performance.

SUMMARY OF THE INVENTION

A ceramic electronic device and a method of manufacturing the device are provided. The device has an improved insulating and soldering properties thus having an increased operational reliability.

The ceramic electronic device includes a ceramic element, an external electrode provided on the ceramic element, and a protective layer provided on the ceramic element. The protective layer is formed through impregnating and dehydrating condensation of a composition expressed by R—$C_nH_{2n}$—Si—$(OR')_3$ (where R is epoxy, alkyl, aryl, perfluoroaryl, or mixture of them, n is a natural number, and R' is an alkyl group having 1 to 4 carbon atoms, hydrogen, or halogen atom, wherein at least one of R' is hydrogen).

DETAIL DESCRIPTION OF THE PREFERRED EMBODIMENTS (Embodiment 1)

A multi-layer ceramic capacitor, a ceramic electronic device according to Embodiment 1, will be described.

Figure 1:
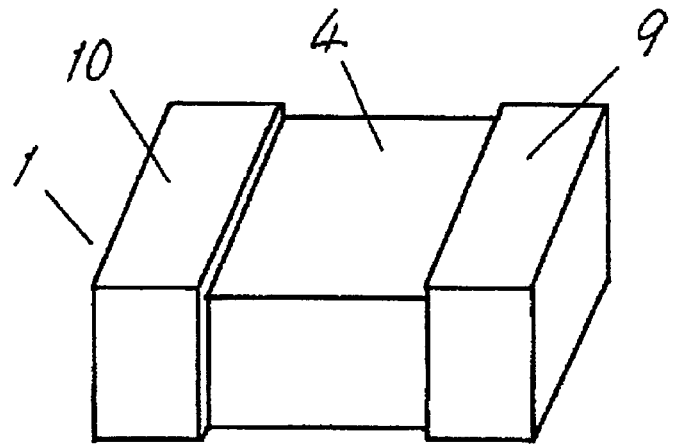
FIG. 1 is an external perspective view of a multi-layer ceramic capacitor according to Embodiments 1, 2 of the present invention.
Figure 2:
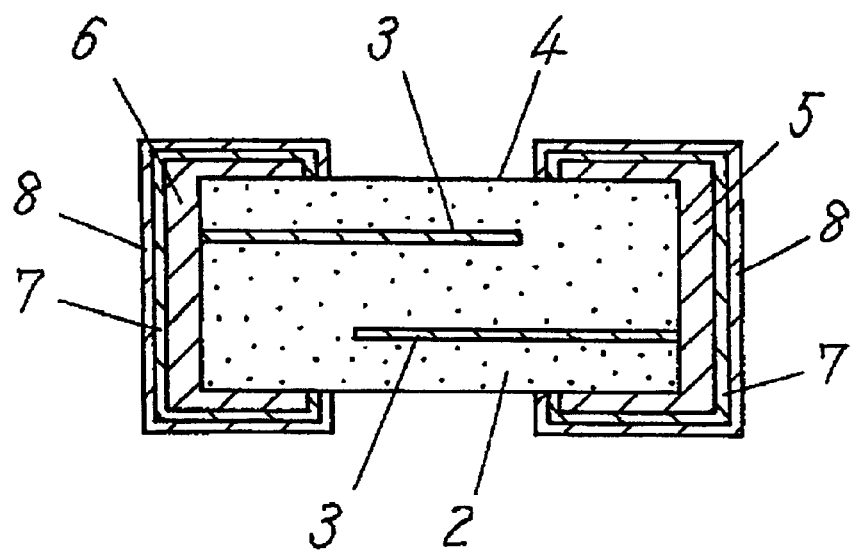
FIG. 2 is a cross sectional view of the multi-layer ceramic capacitor according to Embodiments 1, 2.
Figure 3:
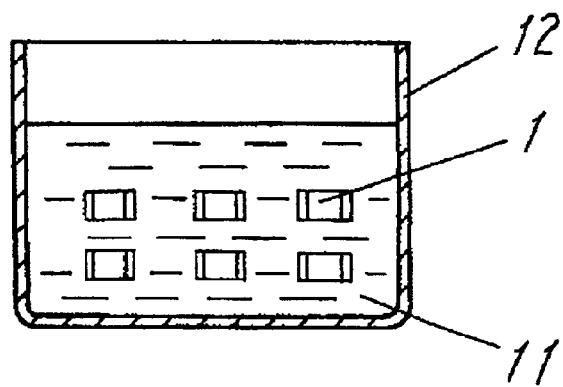
FIG. 3 is a schematic view showing a process of manufacturing the multi-layer ceramic capacitor according to Embodiments 1, 2.
Figure 4:
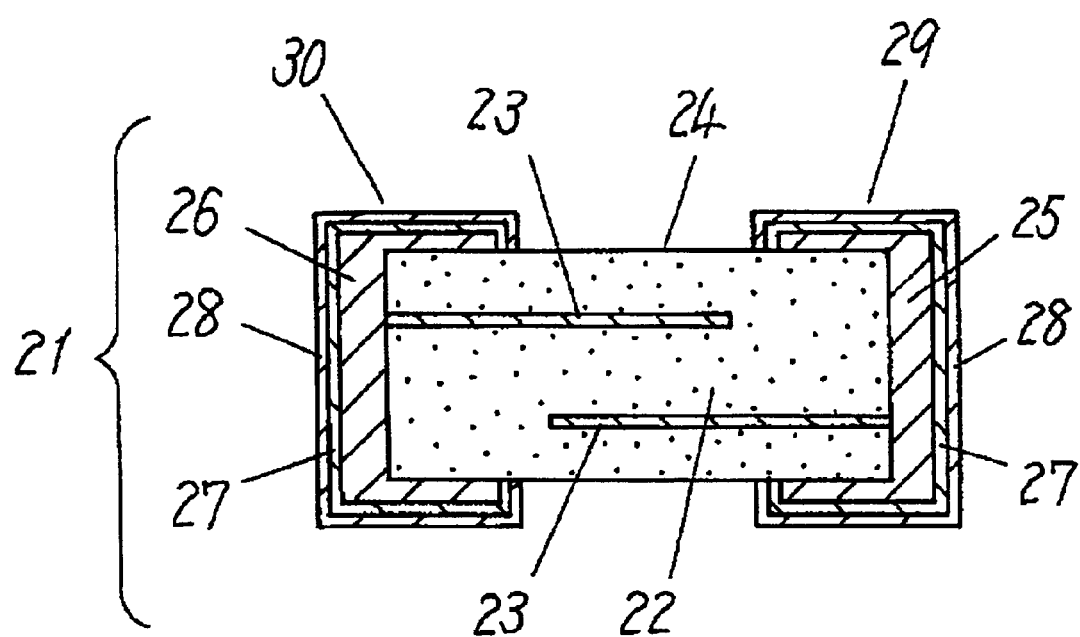
FIG. 4 is a cross sectional view of a conventional multi-layer ceramic capacitor.

FIG. 1 and FIG. 2 are an external perspective view and a cross sectional view of the multi-layer ceramic capacitor, respectively. FIG. 3 is a schematic view showing a process of manufacturing the capacitor.

The multi-layer ceramic capacitor 1 includes a ceramic element 4 and external electrodes 9, 10 provided on both sides of the ceramic element 4. The ceramic element 4 is formed through sintering alternate layers of dielectric ceramic 2 and internal electrodes 3. The electrodes 9, 10 include respective external electrode bases 5, 6 connected to the internal electrode 3, nickel-plating layers 7 on the external electrode bases 5, and solder- or tin-plating layers 8 on the nickel-plating layers 7. The external electrode bases 5, 6 are made of a specific material such as Ag On the ceramic element 4 and the external electrodes 9 and 10, a composition is dehydrated. The composition is expressed by R—$C_nH_{2n}$—Si—$(OR')_3$ (where R is epoxy, alkyl, aryl, perfluoroaryl, or mixture of them, n is a natural number, and R' is an alkyl group having 1 to 4 carbon atoms, hydrogen, or halogen atom, wherein at least one of R' is hydrogen.)

The ceramic element 4 is a sintered dielectric includes a dielectric ceramic 2 and a metal oxide produced through baking the dielectric ceramic 2 at a high temperature. Metallic atoms on the dielectric are turned to hydroxide under the atmospheric condition. The hydroxide and an organic silicon oxide in the composition of R—$C_nH_{2n}$—Si—$(OR')_3$ are dehydrated and condensed, thus providing an (R—), a water repellent protective layer, on the ceramic element 4. This protects the ceramic element 4 from retention of water, thus improving the insulating properties between the two external electrodes 9 and 10 and eliminating migration to occur. As a result, the multi-layer ceramic capacitor 1 has increased operational reliability.

Since also being coated with the water repellent protective layers, the external electrodes 9 and 10 has their plated surfaces be protected from hostile environmental conditions, i.e., moisture, and be maintaining high soldering properties.

A method of manufacturing the multi-layer ceramic capacitor 1 will be described.

First, a pattern of thick paste of such as Pd is printed on the dielectric ceramic 2 and dried, thus providing a sheet having the internal electrode 3 printed thereon.

The sheets are then placed one over the other until being stuck up to a desired thickness for providing a predetermined capacitance. A resultant multi-layer assembly is pressed with a pressure, thus turning into the ceramic element 4.

The ceramic element 4 is baked at about 1,300° C., thus having a sintered dielectric form.

The ceramic element 4 is then coated at both sides with patterns of thick electrode paste of such as Ag which are electrically connected to their corresponding internal electrodes 3. After being baked at a temperature from 800° C. to 900° C. for ten minutes, both the patterns turn to the external electrodes 5 and 6. A nickel-plating layer 7 is provided to cover each of the external electrodes 5 and 6. Finally, a solder plating layer 8 of such as tin is deposited over the nickel-plating layer 7, thus completing the multi-layer ceramic capacitor 1.

In FIG. 3, a vessel 12 is filled with a coating solution 11 containing the composition of $R-C_nH_{2n}-Si-(OR')_3$ (where R is epoxy, alkyl, aryl, perfluoroaryl, or mixture of them, n is a natural number, and R' is an alkyl group having 1 to 4 carbon atoms, hydrogen, or halogen atom, wherein at least one of R' is hydrogen). The multi-layer ceramic capacitor 1 is immersed in the coating solution 11 for about ten minutes.

The coating solution 11 may be doped with a diluent of organic solvent such as isopropyl alcohol. The weight ratio of the coating solution 11 to the mixture of the solution 11 and the diluent, i.e., the dilute concentration, ranges from 0.5% to 100%.

Then, the multi-layer ceramic capacitor 1 is took out of the coating solution 11 and dried at a temperature of about 140 to 160° C. for about 20 minutes.

Organic silicon compound extracted from the coating solution 11 remaining on the multi-layer ceramic capacitor 1, since being vaporized out, does not have to be rinsed off.

A temperature/moisture test was performed for 1,000 pieces of the multi-layer ceramic capacitors 1 according to Embodiment 1 and 1,000 pieces of the conventional multi-layer ceramic capacitors 21. The capacitors were exposed to the environment under a temperature of 40° C. and a relative moisture of 95%, and then, under a temperature of −25° C. with direct current voltage of 12V applied thereto for one hour as one cycle. The cycle was repeated 2,000 times. The insulation resistance was measured before and after the temperature/moisture test. Capacitors exhibiting drastically lower insulation resistance were classified as defectives. The result is shown in Table 1.

A soldering test was also performed for 100 pieces of the multi-layer ceramic capacitors 1 of Embodiment 1 and 100 pieces of the conventional multi-layer ceramic capacitors 21. The capacitors were left under a temperature of 85° C. and relative moisture of 85% RH for 500 hours, and then, immersed in a soldering bath at 230° C. External electrodes not properly coated with strips of solder were classified as defectives. The result is also shown in Table 1.

TABLE 1

| Capacitor | Dilute Concentration (%) | Insulation Defective Rate (%) | Soldering Defective Rate (%) |
|---|---|---|---|
| Conventional | No Coating | 0.3 | 10 |
| Embodiment 1 | 0.5 | 0.3 | 0 |
|  | 1 | 0 | 0 |
|  | 50 | 0 | 0 |
|  | 100 | 0 | 0 |

As apparent from Table 1, the multi-layer ceramic capacitor 1 manufactured according to Embodiment 1 has the water-repellent-protective layer on its surface for inhibiting the retention of water. Accordingly, the insulation defective rate of the multi-layer ceramic capacitor 1 measured at the temperature/moisture test can be smaller than that of the conventional capacitor, and the insulation defective rate measured at the soldering test after the stay under humid conditions also is small.

The coating solution 11 may preferably have not smaller than 1% of concentration.

(Embodiment 2)

A method of manufacturing a multi-layer ceramic capacitor according to Embodiment 2 is substantially identical to that of Embodiment 1 shown in FIG. 1 to FIG. 3, and will be explained briefly.

Similar to Embodiment 1, a ceramic element 4 is baked at about 1,300° C., thus providing a sintered dielectric form. The ceramic element 4 is then coated at both sides with patterns of thick electrode paste of such as Ag which are electrically connected to their corresponding internal electrodes 3. After being baked at a temperature from 800° C. to 900° C. for ten minutes, both the patterns turn to external electrodes 5 and 6. A nickel-plating layer 7 covers each of the external electrodes 5 and 6. Finally, a solder plating layer 8 of such as tin is deposited over the nickel-plating layer 7, thus completing the multi-layer ceramic capacitor 1.

In FIG. 3, a vessel 12 is filled with a coating solution 11 containing a composition expressed by $R-O-C_nH_{2n}-Si-(OR')_3$ (where R is epoxy, alkyl, aryl, perfluoroaryl, or mixture of them, n is a natural number, and R' is an alkyl group having 1 to 4 carbon atoms, hydrogen, or halogen atom, wherein at least one of R' is hydrogen.) The multi-layer ceramic capacitor 1 is then immersed in the coating solution 11 for about ten minutes.

The coating solution 11 like that of Embodiment 1 may be doped with a diluent of organic solvent such as isopropyl alcohol. The weight ratio of the coating solution 11 to the mixture of the diluent and the solution 11, i.e., the dilute concentration, ranges from 0.5% to 100%.

Then, the multi-layer ceramic capacitor 1 is took out of the coating solution 11 and dried at a temperature of about 140 to 160° C. for about 20 minutes.

A temperature/moisture test and a moisture test were performed for 1,000 pieces of the multi-layer ceramic capacitors 1 of Embodiment 2 under the same conditions as that of Embodiment 1 in order to examine the insulating and soldering properties of the external electrodes 9 and 10. Resultant measurements are shown in Table 2.

TABLE 2

| Capacitor | Dilute Concentration (%) | Insulation Defective Rate (%) | Soldering Defective Rate (%) |
|---|---|---|---|
| Embodiment 2 | 0.5 | 0.1 | 0 |
|  | 1 | 0 | 0 |
|  | 50 | 0 | 0 |
|  | 100 | 0 | 0 |

As apparent from Table 2, the multi-layer ceramic capacitor 1 manufactured according to Embodiment 2 exhibits reduced declination in the insulating properties even in the small concentration of the coating solution 11 of 0.5%, and can thus be improved in the operational reliability.

The multi-layer ceramic capacitor 1 is immersed in the coating solution 11 under the atmospheric conditions, but may be immersed in the vessel 12 in vacuum conditions. As the coating solution 11 in vacuum is prevented from unwanted impurities, the multi-layer ceramic capacitor 1 is further improved in the operational reliability.

The ceramic electronic device according to the present invention is not limited to a multi-layer ceramic capacitor, but may be any device including an exposed ceramic element 4 and an external electrode 9 or 10 provided partially on the element. The device according to the present invention like Embodiments 1 and 2 can thus be improved in the operational reliability.

What is claimed is:

1. A ceramic electronic device comprising:

a ceramic element;

an external electrode on said ceramic element, said external electrode having a plating layer provided on a surface of said external electrode; and a water repellent protective layer on said ceramic element and said plating layer, said protective layer being formed through impregnating a compound into said ceramic element and external electrode and through dehydration-condensation, said compound being expressed by a formula of:

$$R-C_nH_{2n}-Si-(OR')_3$$

where R is an epoxy group, alkyl group, aryl group, perfluoroaryl group, or mixture thereof, n is a natural number, and R' is an alkyl group having 1 to 4 carbon atoms, hydrogen, or halogen atom, wherein at least one of R' is hydrogen.

2. A ceramic electronic device according to claim 1, wherein the ceramic element is a sintered dielectric material.

3. A ceramic electronic device comprising:

a ceramic element;

an external electrode on said ceramic element, said external electrode having a plating layer provided on a surface of said external electrode; and a water repellent protective layer on said ceramic element and said plating layer, said protective layer being formed through impregnating, into said ceramic element and external electrode and through dehydration-condensation, a compound being expressed by a formula of:

$$R-O-C_nH_{2n}-Si-(OR')_3$$

where R is an epoxy group, alkyl group, aryl group, perfluoroaryl group, or mixture thereof, n is a natural number, and R' is an alkyl group having 1 to 4 carbon atoms, hydrogen, or halogen atom, wherein at least one of R' is hydrogen.

4. A ceramic electronic device according to claim 3, wherein the ceramic element is a sintered dielectric material.

5. A method of manufacturing a ceramic electronic device, comprising the steps of:

providing a ceramic electronic device including a ceramic element and an external electrode on the ceramic element;

plating the external electrode;

after said step of plating the external electrode, immersing the ceramic electronic device into a solution containing a compound expressed by a formula of:

$$R-C_nH_{2n}-Si-(OR')_3$$

where R is an epoxy group, alkyl group, aryl group, perfluoroaryl group, or mixture thereof, n is a natural number, and R' is an alkyl group having 1 to 4 carbon atoms, hydrogen, or halogen atom, wherein at least one of R' is hydrogen; and taking out the immersed ceramic electronic device from the solution and subjecting the ceramic electronic device to heat treatment.

6. A method according to claim 5, wherein said step of providing the ceramic electronic device includes the substeps of:

forming the ceramic element through stacking an internal electrode and a ceramic layer; and forming the external electrodes on the ceramic element, being electrically connected to the internal electrode.

7. A method of manufacturing a ceramic electronic device comprising the steps of:

providing a ceramic electronic device including a ceramic element and an external electrode on the ceramic element;

plating the external electrode;

after said step of plating the external electrode, immersing the ceramic electronic device into a solution containing a compound expressed by a formula of:

$$R-O-C_nH_{2n}-Si-(OR')_3$$

where R is an epoxy group, alkyl group, aryl group, perfluoroaryl group, or mixture thereof, n is a natural number, and R' is an alkyl group having 1 to 4 carbon atoms, hydrogen, or halogen atom, wherein at least one of R' is hydrogen; and taking out the immersed ceramic electronic device from the solution and subjecting the ceramic electronic device to heat treatment.

8. A method according to claim 7, wherein said step of providing the ceramic electronic device includes the substeps of:

forming the ceramic element through stacking an internal electrode and a ceramic layer; and forming the external electrode on the ceramic element, being electrically connected to the internal electrode.

* * * * *